United States Patent [19]
Roach

[11] Patent Number: 6,021,843
[45] Date of Patent: Feb. 8, 2000

[54] SNOW MELTING APPARATUS FOR WHEEL WELLS

[76] Inventor: Vincent Roach, 7120 Wyoming Blvd. NE., Albuquerque, N.Mex. 87109

[21] Appl. No.: 09/268,548

[22] Filed: Mar. 15, 1999

[51] Int. Cl.⁷ .............................. B60H 1/00; B62D 25/16
[52] U.S. Cl. ................ 165/41; 237/12.3 R; 237/12.3 B; 126/19.5; 126/271.1; 126/343.5 R; 165/51
[58] Field of Search .............................. 165/202, 41, 51; 237/12.3 R, 12.3 B; 126/19.5, 271.1, 343.5 R

[56] References Cited

U.S. PATENT DOCUMENTS

| | | | |
|---|---|---|---|
| 2,231,586 | 2/1941 | Miller | 126/271.1 |
| 2,933,337 | 4/1960 | Katz | 417/76 |
| 3,289,668 | 12/1966 | Drucker | 126/271.1 |
| 3,770,049 | 11/1973 | Wright | 165/41 |
| 4,203,423 | 5/1980 | Ricci | 126/271.1 |
| 4,414,462 | 11/1983 | Price | 126/343.5 R |
| 4,646,818 | 3/1987 | Ervin, Jr. | 126/271.1 |
| 4,662,561 | 5/1987 | Dietzsch et al. | 165/41 |
| 5,573,686 | 11/1996 | Lavicska | 219/202 |

FOREIGN PATENT DOCUMENTS

| | | | |
|---|---|---|---|
| 3310312 | 9/1984 | Germany | 165/41 |
| 3-139416 | 6/1991 | Japan | 165/42 |

*Primary Examiner*—John K. Ford
*Attorney, Agent, or Firm*—Thomas B. Tate

[57] ABSTRACT

A device for melting snow and ice in the wheel wells of a motor vehicle. The device comprises tubing which extends from the radiator of the vehicle to the wheel wells in a continuous loop. When the device is activated by an on-off switch inside the vehicle, warm fluids are circulated through the tubing to melt the ice and snow in the wheel wells.

1 Claim, 1 Drawing Sheet

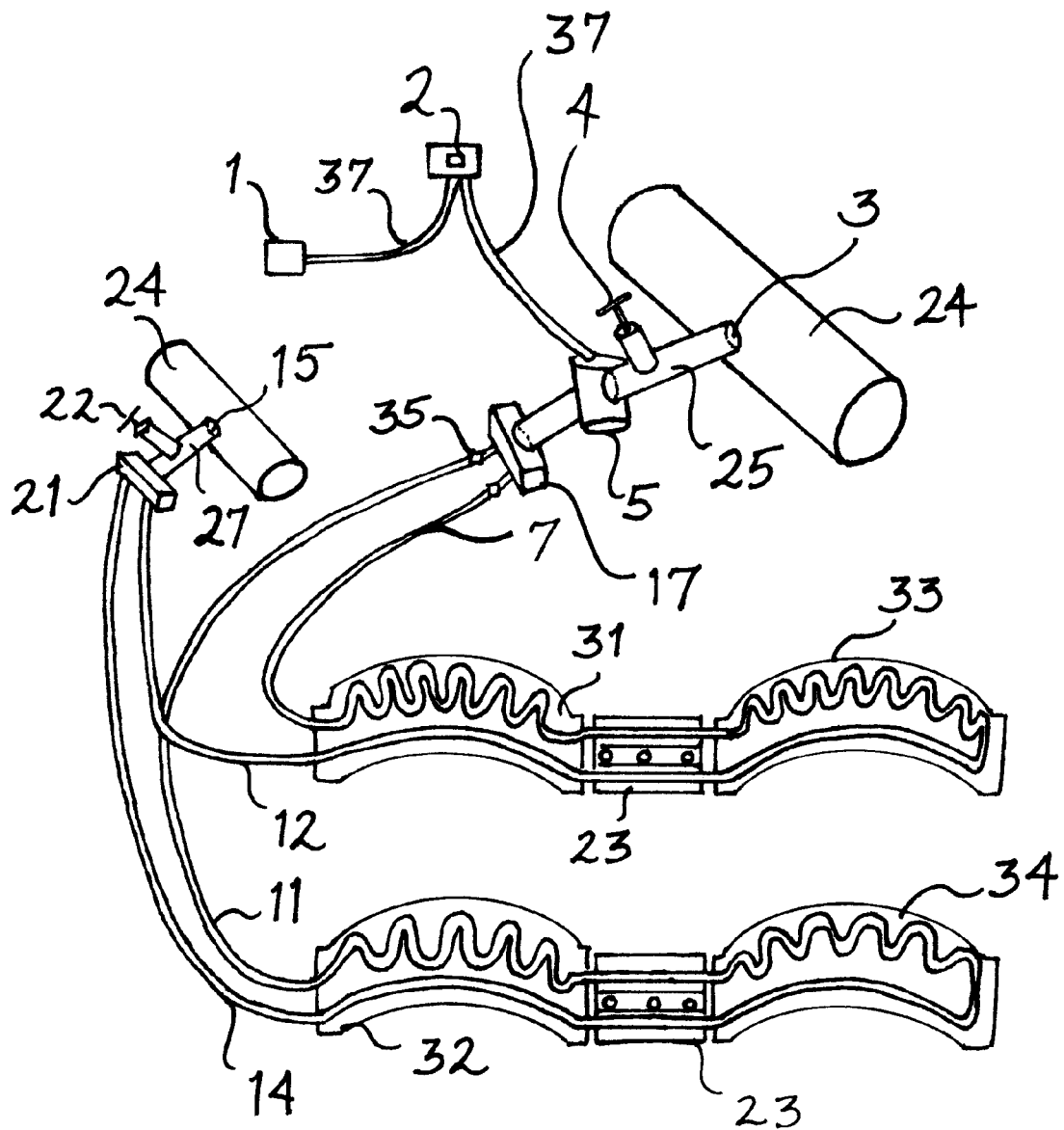

SNOW MELTING APPARATUS FOR WHEEL WELLS

BACKGROUND OF THE INVENTION

The field of invention is deices relating to melting of snow and ice in the wheel wells of motor vehicles.

In parts of the U.S. where temperatures are below freezing for long periods of time, ice and snow build up in the wheel wells of automobiles and other motor vehicles. This is undesirable for both safety and vehicle maintenance reasons. Snow can get into the tire treads, thus lessening traction with the road. Clumps of ice can break off suddenly, falling into the road and becoming a hazard to motorists who run over them. The wheel well area rusts faster than other parts of the car due to the moisture and road salt in the ice and snow. Most people try to correct this problem by attempting to kick lose the ice chunks which hand from the wheel well areas. This method usually only succeeds in damaging the person's boots and occasionally causing foot injuries.

The only known prior art device for melting ice and snow in vehicle wheels wells is described in U.S. Pat. No. 5,573,686 to Lavicska. Lavicska's device uses an electrical radiant heating grid mounted onto a shield which is inserted into the wheel well.

SUMMARY OF THE INVENTION

The present invention is an apparatus which uses a different and more efficient method to melt ice and snow in a vehicle's wheel wells. Tubing extends from the vehicle's radiator to the wheel wells in a continuous loop. When the system is activated by an on-off switch, radiator fluid (including antifreeze) is circulated to the wheel wells to warm the area sufficiently to melt the snow and ice, and is then recycled to the radiator.

This apparatus can be made in slightly different versions depending upon whether it is built in by the manufacturer as part of the vehicle's original equipment or whether it is installed later on an existing vehicle.

DESCRIPTION OF THE DRAWING

The FIGURE is a schematic diagram.

DESCRIPTION OF THE PREFERRED EMBODIMENT OF THE INVENTION

An on-off switch 2 is located inside the passenger compartment of the vehicle, preferably in the middle of the dashboard near the defroster button. The on-off switch 2 is preferably a push-button type wherein the switch is on when the button is pushed in, and off when the button is pushed out.

A piece of rubber tubing (hot coolant hose) 25 exits the radiator 24 from opening (hot coolant hose hookup) 3 in the upper housing of the radiator 24. Mounted on the tubing 25 are shut-off valve 4 (vacuum-operated; also can be shut of manually) and a vacuum switch 5. A first line splitter 17 is mounted on the tubing 25 below valve 4 and switch 5. The tubing 25 splits into two pieces of metal (preferably copper) tubing inside the line splitter 17, which has two hookup prongs 35. The copper tubing is threaded pipe which can be disassembled, and is insulated by plastic wrapped directly around the copper tubing. Each of these pieces of copper tubing becomes a feeder line, one of them (left feeder line 11) extending to the left front 32 and rear 34 wheel wells and the other one (right feeder line 7) extending to the right front 31 and rear 33 wheel wells. The feeder lines 7 and 11 form one or more S-loops along the walls of the wheel wells 31, 33, 32, and 34 and have a straight connecting piece running along he bottom of the chassis between the front 31, 32 and rear 33, 34 wheel wells. At the back of the rear wheel wells 33 and 34, the lines become return lines (left return line 14 and right return line 12), which run along the bottom of the chassis to the front wheel wells 32 and 31, and which follow the curvature of the wheel wells 34 and 32, 33 anfd 31, but are otherwise straight. The feeder lines 7 and 11 and return lines 12 and 14 are bolted to the chassis by bracket plates 23. The return lines 12 and 14 continue from the front wheel wells 31 and 32 to a second line splitter 21 which rejoins them in to a single piece of rubber tubing (return coolant hose) 27 which enters the lower housing of the radiator 24 through an opening (return coolant hose hookup) 15. A manual shut-off valve 22 is mounted on the tubing 27 between the line splitter 21 and the radiator 24. The tubing 25, 7, 11, 12, 14, and 27 thus forms a continuous loop from the radiator 24 to the wheel wells 32 and 33, 32 and 34, and back to the radiator 24.

The on-off switch 2 is connected by vacuum hoses 37 to the vacuum switch 5 and to the exhaust intake manifold hookup 1. When the on-off switch 2 is activated to the on position, the vacuum switch 5 creates suction to lift and open the shut-off valve 4. Fluid then flows from the radiator 24 through the feeder lines 7 and 11 to the wheels wells 31, 33, 32, and 34 to melt the ice and snow therein, then is circulated back through the return lines 12 and 14 to the radiator 24 and is recycled to the engine so as to keep the fluid warm.

The above description of the invention is the version which is built in during the manufacturing process. The version for after market installation varies in several ways. The feeder lines 7 and 11 extend only to the right 31 and left 32 front wheel wells and then form their return loops 12 and 14 rather than extending to the rear wheels wells 33 and 34. The lines are attached to the wheel wells by a bracket rather than being directly attached to the inner walls of the wheel wells. Radiator adaptors are provided at the exit and entry point of the tubing in order to provide the equivalent of openings 3 and 15, which would not be present when the snow melting apparatus was not part of the vehicle's original equipment.

In an alternative embodiment of the invention, it is possible to use an electric motor instead of the vacuum switch 5 to open and close valve 4. In this case, electric wiring rather than vacuum hoses 37 would connect the on-off switch 2 to the electric motor.

I claim:

1. A vehicle in combination with a device for melting snow and ice in the wheel wells of a motor vehicle, comprising:

an on-off switch located inside the passenger compartment of said vehicle;

means connecting said on-off switch to a vacuum switch for actuating a valve and to the intake manifold on an engine of said vehicle;

tubing connected to the radiator of said vehicle, said tubing having mounted thereon said valve, vacuum switch for actuating said value, and a first line splitter which divides said tubing into two feeder lines, one of which extends to the front and rear wheel wells on the left side of said vehicle and the other of which extends to the front and rear wheel wells on the right side of said vehicle, each of said feeder lies then becoming, by forming a continuous loop, a return line from its respective wheel wells to a second line splitter which reunites said two return lines into one piece of tubing which connects to said radiator.

* * * * *

UNITED STATES PATENT AND TRADEMARK OFFICE
CERTIFICATE OF CORRECTION

PATENT NO.   : 6,021,843
DATED        : Feb. 8, 2000
INVENTOR(S)  : Vincent Roach It is certified that error appears in the above-identified patent and that said Letters Patent is hereby corrected as shown below:

Col. 1, line 6- "deices" should read "devices"

Col. 1, line 18- "lose" should read "loose" and "hand" should read "hang"

Col. 1, line 55- "of" should read "off"

Col. 2, line 6- "anfd" should read "and"

Col. 2, line 11- "in to" should read "into"

Col. 2, line 17- "wheel wells 32 and 33,32 and 34," should read "wheel wells 31 and 33, 32 and 34,"

Claim 1, line 7 (col. 2, line 52)- "on" should read "of"

Claim 1, line 16 (col. 2, line 61)- "lies" should read "lines"

Col. 2, line 1, "he" should read "the".

Signed and Sealed this

Thirty-first Day of October, 2000

*Attest:*

Q. TODD DICKINSON

*Attesting Officer*    *Director of Patents and Trademarks*